United States Patent [19]
Johnson

[11] 3,760,350
[45] Sept. 18, 1973

[54] PNEUMATIC TIRE PRESSURE SENSOR

[76] Inventor: Eugene L. Johnson, Box 387, Holt Summit, Mo. 65043

[22] Filed: Mar. 27, 1972

[21] Appl. No.: 238,561

[52] U.S. Cl................ 340/58, 73/146.5, 200/61.25, 200/83 R, 340/60
[51] Int. Cl............................................. B60c 23/00
[58] Field of Search...................... 340/52 D, 58, 60, 340/238, 240; 200/61.03, 61.25, 83 J, 83 P, 83 Q, 83 S, 83 SA, 83 A, 61.26, 83 R; 73/406, 146.2, 146.4, 146.5

[56] References Cited
UNITED STATES PATENTS

| | | | |
|---|---|---|---|
| 2,926,524 | 3/1960 | Sanders | 73/406 |
| 3,462,735 | 8/1969 | Hawes | 340/58 |
| 3,508,193 | 4/1970 | Giovannelli et al. | 340/58 |
| 3,592,063 | 7/1971 | Rieschel | 73/406 |

Primary Examiner—John W. Caldwell
Assistant Examiner—Joseph E. Nowicki
Attorney—Glenn K. Robbins et al.

[57] ABSTRACT

A tire pressure sensor for pneumatic tires. The sensor is comprised of housing mounted on a wheel having a diaphragm within the housing separating a control chamber on one side of the housing and a tire pressure chamber on the other side of the housing. The control chamber communicates with the tire pressure chamber through a passageway which is adapted to be opened and closed by a plug valve. The diaphragm operates on pressure differential when the tire pressure chamber communicating through a sensing tube at the interior of the tire falls below the pressure in the control chamber causing the movement of the diaphragm and a plunger connected to it. The plunger upon activation of the diaphragm makes contact with a circuit on the back plate of the wheel to energize a warning light on the dash board. Through the use of different diaphragms, different activating pressure differentials of two to ten pounds or more beyond the normal tire pressure can be provided to vary the sensing and alarm range.

5 Claims, 6 Drawing Figures

PNEUMATIC TIRE PRESSURE SENSOR

SUMMARY OF THE INVENTION

In the past various types of tire pressure sensors have been provided. Such sensors have been relatively complicated and difficult to set up in their operation and of relatively substantial expense.

By means of this invention, there has been provided a simply designed tire pressure sensor that can be mounted on a vehicular wheel flange or a car, truck or the like having a sensing tube communicating with the interior of the tire without interfering with the conventional tire valve stem. For tires equipped with tubes, the "sensing tube" must be connected to the valve stem by conventional means. The operation is simply effected by opening a sensor valve plug, filling the tire with air to the air pressure at which the sensor is desired to be operated, closing the valve plug to seal the control chamber and then filling the tire to an increased pressure corresponding to the desired running tire pressure. The sensor has a diaphragm which operates on a pressure differential when the air pressure within the tire falls to the necessary pressure differential to operate the diaphragm and the sensor. Upon the operation of the diaphragm a plunger connected to the diaphragm moves against an electrical contact to complete an electrical circuit through the wheel to a warning light on the dashboard.

The sensor is adaptable in that different diaphragms can be employed to function at different pressure differentials as desired varying from two to ten pounds or more. It is the pressure differential rather than the total pressure that causes the operation of the sensor which simplifies the operation. The sensor is mechanical and has no complicated moving parts relying only on the movement of the diaphragm upon the activation of the sensor when the tire pressure falls below the pressure differential operating value. Thus, the sensor is in a completely passive state until activation. The operaion is instantaneous when the tire pressure falls to the pressure differential operating value. The sensor is small and compact and rugged and easily installed upon the wheel flange on various types of automotive equipment. The valve plug is simple in construction and adapted to be operated by a screwdriver or the like. The valve plug is opened to set the control chamber at the desired safety warning pressure then and seals the control chamber after closing. The tire is then filled to the normal running tire pressure which completes the preparing of the sensor for operation. The diaphragm upon activation in the tire filling operation makes an audible click and can be used as an audible tire gage indicating that the pressure differential has been reached. The audible click of the diaphragm obviates the necessity of a separate tire gage. The use of the diaphragm is simple and by different diaphragms, different tire pressures can be employed for the front and rear wheels. Thus for cars pulling trailers where a higher tire pressure is desired a diaphragm having a higher activating pressure can be simply employed.

The above features are objects of this invention and further objects will appear in the detailed description which follows and will be otherwise apparent to those skilled in the art.

For the purpose of illustration there is shown in accompanying drawings a preferred embodiment of the invention. It is to be understood that these drawings are for the purpose of illustration only and that the invention is not limited thereto.

DESCRIPTION OF THE INVENTION

Figure 1:
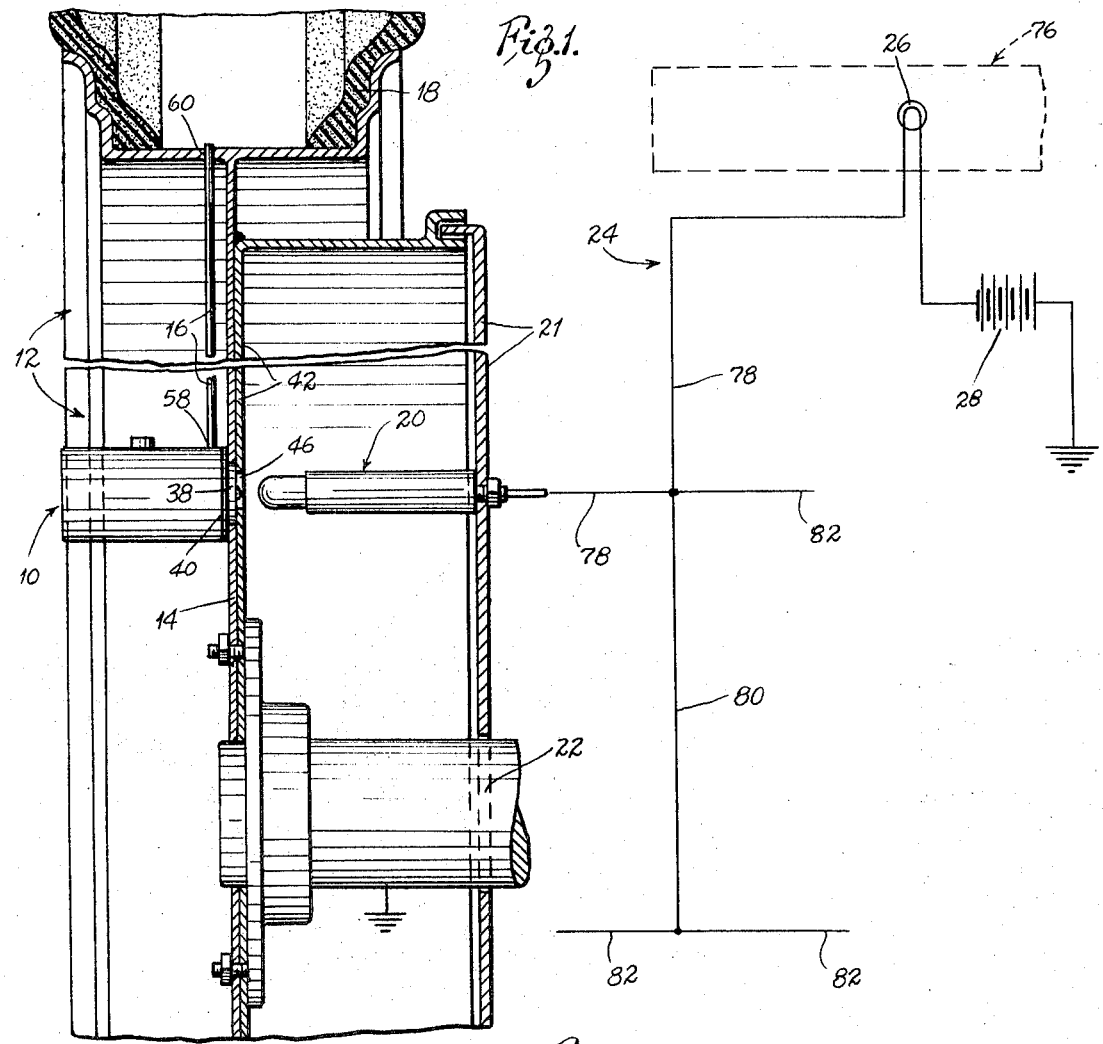
FIG. 1 is a fragmentary view in vertical section through the axis of a wheel provided with the sensor of this invention and schematically showing the circuitry of the alarm circuit.
Figure 2:
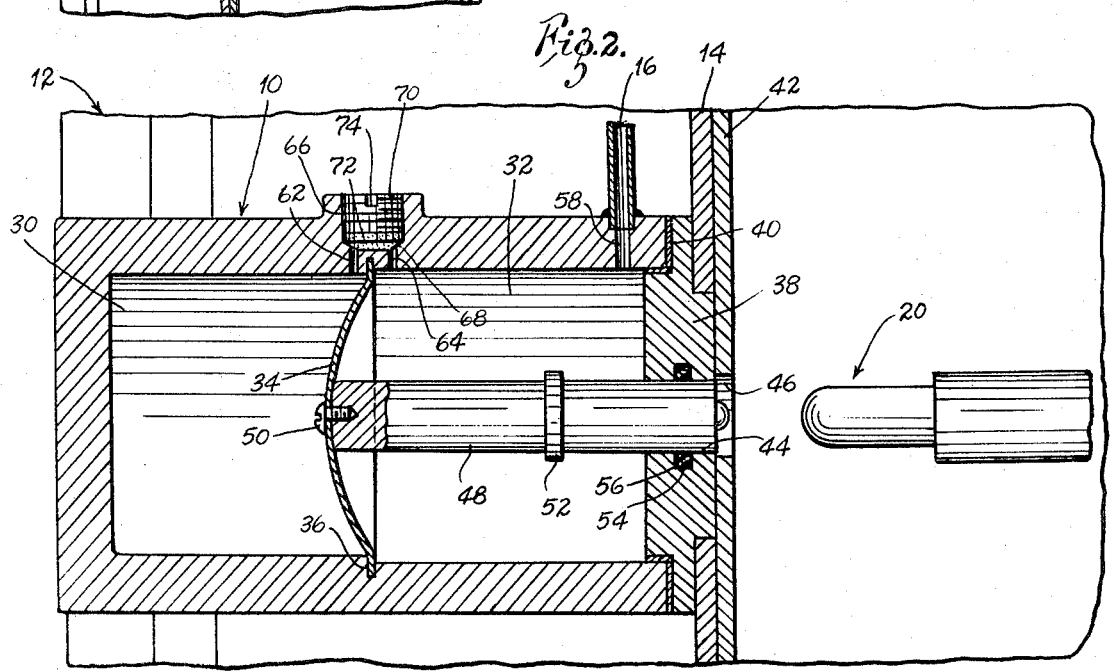
FIG. 2 is an enlarged view in vertical section through the longitudinal axis of the sensor in the deactivated position.
Figure 3:
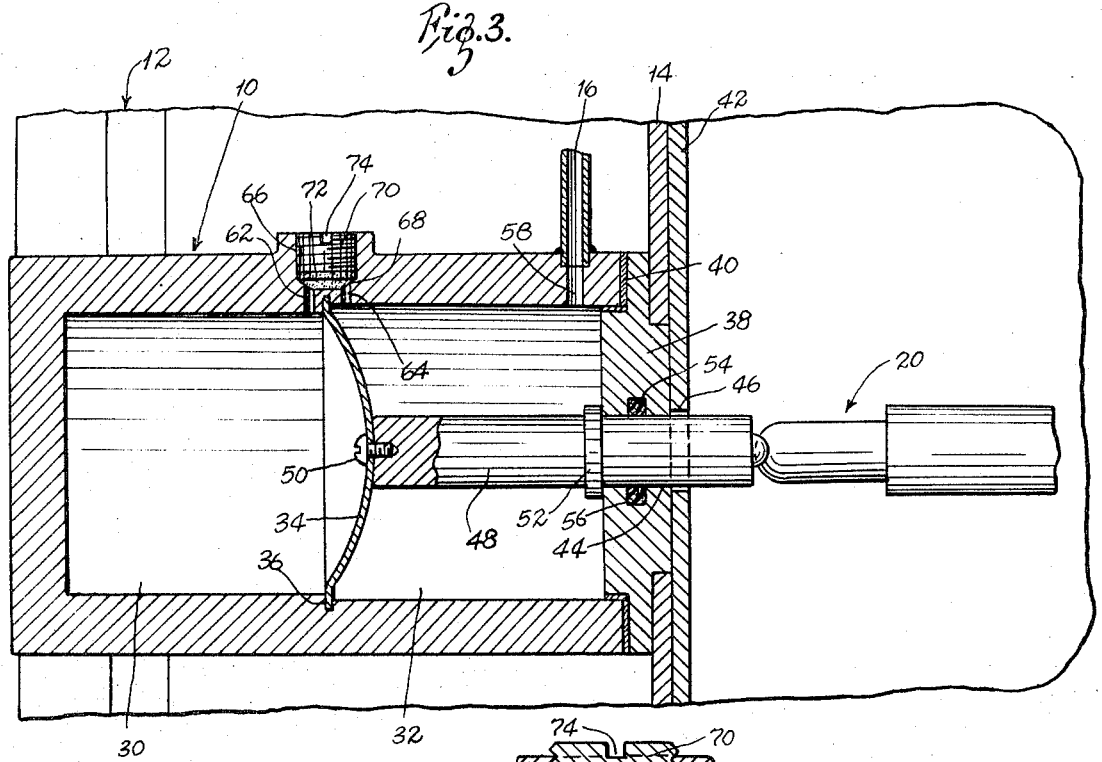
FIG. 3 is a view in section taken similar to FIG. 2 but showing the sensor activated.

The tire pressure sensor of this invention is generally indicated by reference numeral 10 in FIGS. 1 through 3. It is shown connected on a wheel 12 at the wheel flange 14. The tire pressure sensor tube 16 communicates with the interior of a tire 18. The sensor is positioned on the wheel flange in registry with an electrical contact 20 mounted on the stationary back plate 21 of the wheel preferably above the axle 22. In the case of "disc" brakes, the electrical contact 20 would be mounted on the wheel brake cylinder housing which is "generally" in front of the axle. The contact 20 forms part of an electrical circuit 24 comprised of a warning light 26 on the dashboard of the car and the battery 28.

The tire pressure sensor housing or case 10 is best shown in FIGS. 2 and 3. As there shown, the housing 10 is comprised of a control chamber 30 and a tire pressure chamber 32 formed in the open body of the housing. The chamber 32 has a slightly larger diameter than the chamber 30 and receives a diaphragm 34 mounted against a shoulder 36 acting as a diaphragm seat and forming the boundary between the control chamber and the tire pressure chamber.

A metallic end cap 38 is sealed to the end of the housing by a seal 40. It is connected to an opening in the wheel flange 14 and the brake drum face 42 by welding, press fit, threading or other conventional means of affixation. An opening 44 is provided in the end cap in registry with an opening 46 in the brake drum face to receive a plunger metallic 48. By the use of a small brass, or other metallic, diaphragm located in the brake drum face 42, the entire unit can then be made of plastic. This connecting diaphragm will shoot the current directly through the brake drum face, through the axle and through chassis—rather than through the plunger, the metalic end cap, the wheel flange and the brake drum face, etc.

A further benefit of this connecting diaphragm is that it reduces the plunger travel distance by the thickness of the brake drum face. This may be desirable because of the small volume of air in the control chamber. Too great a movement in the control diaphragm will affect the control pressure.

The plunger 48 is connected at one end to the diaphragm 34 by a screw or other means 50. The opposed end fits through the opening in the end cap and in the brake drum face in the relationship shown in FIGS. 2 and 3. A collar 52 serves as a stop abutting against the inside face of the end cap. In order to provide sealing relation for the plunger an O-ring 54 is seated within annular seat 56 formed in the opening 44 of the end cap, or maybe affixed to a groove in plunger 48 to function as a pressure contact seal in lieu of a sliding seal. (This may be unnecessary to describe, but it is another means.)

The tire pressure chamber 32 communicates with the tire cavity of the tire 18 through the sensor tube 16. This tube is connected to an opening 58 in the side wall of the sensor housing as shown in FIGS. 2 and 3. The opposite end of the sensor tube 16 is connected to an opening 60 in the periphery of the wheel as shown in FIG. 1.

In order to provide communication between the control chamber 30 and the tire pressure chamber 32 to pressurize the control chamber, a passageway 62 is drilled into the side wall of the housing communicating with the control chamber as shown in FIG. 2. A similar passageway 64 is drilled in to the tire pressure chamber 32. Both passageways 62 and 64 communicate with a threaded opening 66 formed in the wall of the housing to provide a valve chamber 68. The opening 66 has a tapering valve seat 68 for blocking off communication.

Figure 4:
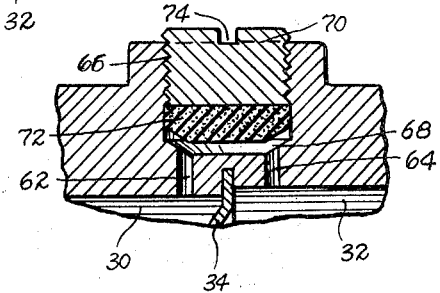
FIG. 4 is an enlarged fragmentary view in vertical section taken through the axis of the plug valve.

A threaded plug valve 70 is used to close the threaded opening 66. The valve plug 70 as best shown in FIG. 4 is provided with a valve face sealing member 72 of a dish shaped configuration which mates with the valve seat 68 when the plug is closed against it. A slot 74 is provided in the top of the valve plug in order to receive a screwdriver or the like for manual opening and closing of the valve plug.

The electrical circuit is best shown in FIG. 1. It is comprised of warning lamp 26 mounted on the vehicle dashboard 76 connected to the battery 28 and the ground. The warning lamp is then connected by leads 78 to the contact 20 associated with the tire pressure sensor. When the sensor is activated as shown in FIG. 3, the plunger 48 establishes contact with the contact 20 and provides an electrical path through the end cap of the housing. The wheel flange 14, the brake drum face and the axle 22 constitute a ground completing the circuit. Although FIG. 1 shows connection to a single wheel, it will be understood that through lead 80 connection to additional contact leads 82 for each of the additional three wheels may be established for sensing all four wheels in the automobile. For trucks, trailers, and the like having more than four wheels, it will be understood that additional sensors and contacts are employed for each of the wheels.

Figure 6:
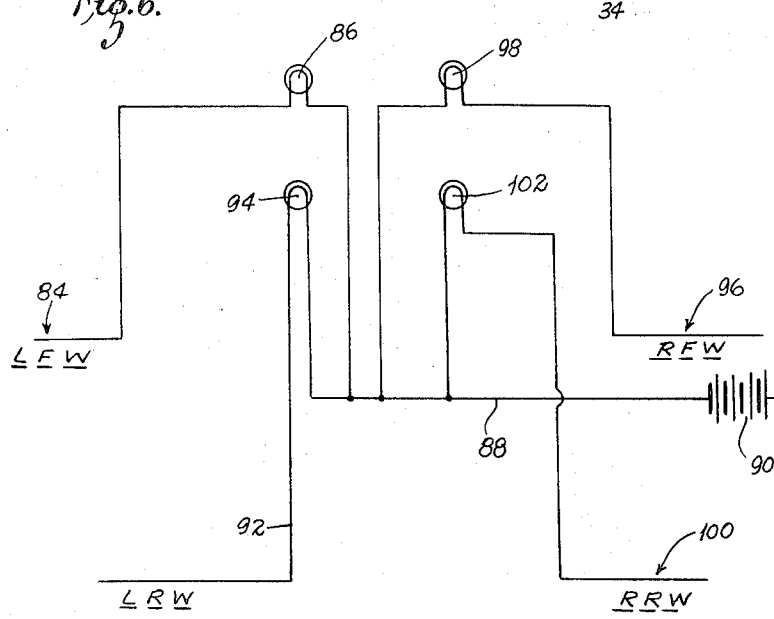
FIG. 6 is a schematic view showing a modified individual wheel alarm circuit.

FIG. 6 shows a modified circuit for individual sensing of each wheel. An individual warning lamp is provided to indicate the pressure reduction in the associated wheel. In FIG. 6, the left front wheel is indicated by the reference numeral 84 which is connected to the warning lamp 86. The warning lamp is connected to a common lead 88 connected to battery 90 and the ground. The circuit for the left rear wheel is indicated by reference numeral 92 and warning lamp 94 which in turn is connected to the common lead 88. The right front wheel is indicated by the reference numeral 96 and associated warning lamp by the reference numeral 98 similarly connected to the common lead 88. The rear right wheel contact is indicated by the reference numeral 100 and its associated warning lamp by the reference numeral 102 connected as aforedescribed to the common lead 88.

OPERATION

The sensor of this invention after installation is simply adjusted and used as the only tool required is a screwdriver or such for operation of the equalizing pressure plug valve. The tire gage actually is not required after the control chamber is sealed since the audible click of the diaphragm when a single action diaphragm is employed indicates when the pressure differential has been obtained and the few pounds pressure above this value can be estimated for the tire running pressure. With proper diaphragm design (one that is stable in both positions) the click will indicate exact pressure. That is, if activation is desired at 10 lb. below running pressure, the diaphragm will snap at 5 lb. differential. As an example—Desired running pressure may be 35 lb, desired activation pressure may be 25 lb., and control chamber is set at 30 lb. (This is for a "bistable" diaphragm activated by 5 lb. differential either side of the control chamber pressure of 30 lb. The sensor 10 is set by opening the equalizing valve 66 by the use of a screwdriver. The valve is opened to move the valve face 72 away from the valve seat 68 to open communication between passages 62 and 64 which communicate the control chamber 30 with the tire pressure chamber 32. In this relation the diaphragm is in a normally biased position as shown in FIG. 3. A closed equal pressure system is thus established between chambers 30 and 32 and the tire through the sensor tube 16.

Figure 5:
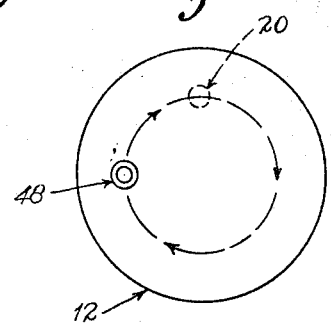
FIG. 5 is a schematic view showing the relative rotation of the wheel provided with the sensor and the alarm circuit contact on a stationary portion of the wheel support.

The tire is then inflated to the pressure at which the driver wishes the sensor to function. The plug valve 66 is then closed to seal the valve face 72 against the valve seat 68. The tire is then inflated to the normal running and operating pressure. The increase in pressure in the tire pressure chamber 32 causes the diaphragm to snap to the position shown in FIG. 2. The pressure at which the pressure is set is dependent upon the stiffness of the diaphragm and it will be understood that diaphragms of varying stiffness may be employed to provide different ranges of operation. The setting of the diaphragm takes place with an audible click to advise the operator that the sensor is now set. The pressure at which the sensor sets itself may be predetermined by use of an appropriate diaphragm from two to 10 pounds differential more or less. As an example, the diaphragm may desirably function when the pressure differential is five pounds. When the pressure in the tire pressure chamber 32 and within the tire drops 5 pounds below that in the control chamber 30, the diaphragm will be activated to move to the position shown in FIG. 3 and thereby activate the warning system 24. The activation of the diaphragm causes the movement of the plunger to the position shown in FIG. 3 to establish contact with the contact 20 to complete the ground circuit and energize the warning system and light up the warning lamp 26. The movement of a right wheel is shown in FIG. 5, illustrating the rotary wheel movement and the sensor 10 and the plunger 48 to provide contact with the contact 20. The rapid rotation of the wheel will cause a flickering of the warning lamp 26 to provide a visible signal difficult to ignore and is an added safety factor.

Once the driver has determined that the pressure is low in the tire, the tire can be checked out and either removed or repaired or simply brought up to the necessary pressure. The resetting or the sensor is accomplished in the same manner as aforedescribed.

In FIG. 6, individual warning circuits are provided for each of the wheels such that the operator can determine by the appropriate warning lamp which tire is low. The operation of the sensor is the same for the common circuit of FIG. 1 and the separate circuits of FIG. 6.

Various changes and modifications within this invention may be made as will be apparent to those skilled in the art. Such changes and modifications are within the scope and teaching of this invention as defined by the claims appended hereto.

What is claimed is:

1. A tire pressure sensor comprising a sensor housing mounted on a wheel, said housing constituting a sealed chamber, a pressure responsive diaphragm dividing the chamber into a first sealed chamber, and a second chamber having passage means communicating with the interior of the tire being sensed, a plunger in the second chamber connected to said diaphragm and movable with the diaphragm by pressure differential caused by tire pressure change to engage a contact on the wheel supporting means to energize an electrical alarm circuit, said housing having a passage way communicating the first and second chambers to provide a balanced pressure there between and control means for opening and closing said passageway.

2. The tire pressure sensor of claim 1 in which said control means is comprised of a valve means mounted on the housing, said valve means comprising a valve communicating with a first passage opening into the first chamber and a second passage opening into the second chamber and a valve member movable in said valve chamber from a valve seated position closing the valve means to a valve open position.

3. The tire pressure sensor of claim 2 in which said valve means comprises an opening threadably receiving the valve member and said valve member is in the form of a threaded plug having tool receiving means.

4. The tire pressure sensor of claim 1 in which the plunger is reciprocably movable through an opening in the wheel, sealing means in a wall of the second chamber engaging the plunger in sealing relation, said plunger being movable by the actuation of the diaphragm through the sealing means into intermittent cyclic engagement with a stationary electrical contact mounted on the wheel support to provide an intermittent warning.

5. The tire pressure sensor of claim 1 in which the diaphragm makes an audible sound when activated and is of a preselected stiffness which indicates the desired running tire pressure.

* * * * *